United States Patent
Kibutu et al.

(10) Patent No.: US 10,250,423 B2
(45) Date of Patent: Apr. 2, 2019

(54) MODEM APPARATUS, COMMUNICATIONS SYSTEM AND METHOD OF PROCESSING A CYCLIC PREFIX

(71) Applicant: u-blox AG, Thalwil (CH)

(72) Inventors: Peter Mutitika Kibutu, Melbourn (GB); Norman John Beamish, Cork (IE)

(73) Assignee: u-blox AG, Thalwil (CH)

( * ) Notice: Subject to any disclaimer, the term of this patent is extended or adjusted under 35 U.S.C. 154(b) by 0 days.

(21) Appl. No.: 15/575,895

(22) PCT Filed: Jun. 11, 2015

(86) PCT No.: PCT/EP2015/063064
§ 371 (c)(1),
(2) Date: Nov. 21, 2017

(87) PCT Pub. No.: WO2016/198114
PCT Pub. Date: Dec. 15, 2016

(65) Prior Publication Data
US 2018/0123846 A1  May 3, 2018

(51) Int. Cl.
*H04L 27/00* (2006.01)
*H04L 27/26* (2006.01)

(52) U.S. Cl.
CPC .............................. *H04L 27/2607* (2013.01)

(58) Field of Classification Search
CPC ............... H04L 5/0007; H04L 27/2607; H04L 27/2666; H04L 27/2634
(Continued)

(56) References Cited

U.S. PATENT DOCUMENTS

2006/0245472 A1* 11/2006 Pan .................... H04L 5/026
375/144
2007/0135068 A1* 6/2007 Li ...................... H04B 1/406
455/132
(Continued)

FOREIGN PATENT DOCUMENTS

WO  WO-2012/016353 A1  2/2012
WO  WO-2012/048717 A1  4/2012

OTHER PUBLICATIONS

International Search Report PCT/ISA/210 for International Application No. PCT/EP2015/063064 dated Feb. 8, 2016.
(Continued)

*Primary Examiner* — Emmanuel Bayard
(74) *Attorney, Agent, or Firm* — Finnegan, Henderson, Farabow, Garrett & Dunner LLP (57) ABSTRACT

A modem apparatus is configured to provide wireless network access in accordance with an Orthogonal Frequency Division Multiplexing communications scheme. The apparatus comprises a hardware subsystem comprising baseband processing components (302) and Radio Frequency processing components (304). The baseband processing components (302) comprise a first converter component (314) arranged to convert between time and frequency domains in accordance with the Orthogonal Frequency Division Multiplexing communications scheme, and a second converter component (316) arranged to convert between parallel and serial data formats, the second converter (316) being operably coupled to the first converter (314). The Radio Frequency processing components (304) comprise a cyclic prefix processing component (318) responsive to control information. A digital interface (306) is disposed between the baseband processing components (302) and the RF processing components (304), the digital interface (306)
(Continued)

being operably coupled to the second converter (316) and the cyclic prefix processing component (318).

21 Claims, 7 Drawing Sheets

(58) Field of Classification Search
USPC .......................................... 375/219–222, 260
See application file for complete search history.

(56) References Cited

U.S. PATENT DOCUMENTS

| | | | |
|---|---|---|---|
| 2008/0225965 A1* | 9/2008 | Pi .......................... | H04L 1/0003 375/260 |
| 2010/0002571 A1* | 1/2010 | Liao .................... | H04L 27/2647 370/208 |
| 2011/0096814 A1* | 4/2011 | Wu ..................... | H04L 27/2604 375/219 |
| 2011/0142000 A1* | 6/2011 | Han ...................... | H04L 5/0053 370/329 |
| 2011/0150127 A1* | 6/2011 | Calabro ............ | H04L 25/03878 375/295 |
| 2013/0315288 A1 | 11/2013 | Weng et al. | |
| 2015/0124688 A1* | 5/2015 | Xu ........................ | H04B 7/0452 370/312 |
| 2016/0149743 A1* | 5/2016 | Rong .................... | H04B 7/0452 370/329 |
| 2016/0174214 A1* | 6/2016 | Yerramalli ........ | H04W 72/0413 370/329 |
| 2016/0182371 A1* | 6/2016 | Han ........................ | H04L 45/74 370/392 |
| 2017/0155439 A1* | 6/2017 | Chang .................. | H04B 7/0617 |
| 2017/0250772 A1* | 8/2017 | Zhang .................... | H04L 5/026 |

OTHER PUBLICATIONS

Written Opinion of the International Searching Authority PCT/ISA/ 237 for International Application No. PCT/EP2015/063064 dated Feb. 8, 2016.

* cited by examiner

MODEM APPARATUS, COMMUNICATIONS SYSTEM AND METHOD OF PROCESSING A CYCLIC PREFIX

FIELD OF THE INVENTION

The present invention relates to a modem apparatus of the type that, for example, comprises baseband processing components and radio frequency processing components configured in accordance with the Orthogonal Frequency Division Multiplexing communications scheme. The present invention also relates to a method of processing a cyclic prefix, the method being of the type that, for example, digitally interfaces between baseband processing components and radio frequency processing components.

BACKGROUND OF THE INVENTION

Communications systems that are reliant upon Orthogonal Frequency Division Multiplexing schemes, for example Long Term Evolution (LTE) communications systems, which are sometimes referred to as 4G communications systems, are known to employ base stations, sometimes referred to as evolved Node Bs (eNode Bs) capable of communicating with User Equipment (UE) units. The UE units are typically used by subscribers to one or more cellular communications services provided by a network infrastructure that comprises a plurality of the eNode Bs to support a respective plurality of notional cells that provide wireless communications coverage for the UEs over a geographic region. The eNode Bs and the UE units are examples of communications equipment that comprise modems. For some applications, it is desirable to implement a modem using a baseband Integrated Circuit (IC) operably coupled to a separate Radio Frequency (RF) IC, because greater design flexibility is achieved.

In the UE unit, the baseband IC and the RF IC together support a transceiver architecture having a transmit chain and a receive chain that support operation in accordance with the different variants of the Orthogonal Frequency Division Multiplexing (OFDM) communications scheme used respectively for uplink and downlink communications. Typically, a received signal is down-converted by the RF IC and communicated to the baseband IC centred about a frequency in a range of baseband frequencies. Similarly, digital signals to be transmitted are generated in the baseband IC, centred about a frequency in the range of baseband frequencies, and communicated to the RF IC, where they are modulated onto a carrier signal having a carrier frequency. The signals communicated between the baseband IC and the RF IC are communicated via a digital interface.

However, LTE and, especially the LTE-Advanced variant, employs a number of methods to increase wireless communications data rate and/or reliability, for example Multiple Input Multiple Output (MIMO) and carrier aggregation. Such optimisations result in an increase in the amount of data that the digital interface needs to support being communicated thereacross. Increasing data throughput with respect to the digital interface introduces undesirable consequences, for example, an increase in power consumption attributable to the digital interface and an increase in the complexity of the digital interface, such as by virtue of a requirement to increase the number of physical pins to support data communication between the broadband IC and the RF IC. Indeed, the design of the digital interface has been continually optimised in order to support progressively more stringent bandwidth requirements, energy consumption requirements and attempts to minimise signal interference between ICs. However, as indicated above, certain optimisations are accompanied by an associated technical cost, which sometimes also has negative financial implications.

US patent publication no. 2013/3315288 also strives to reduce the amount of data transmitted over a digital interface. However, the saving in data throughput is achieved by controlling word length of digital samples of a received signal.

BRIEF SUMMARY OF THE INVENTION

According to a first aspect of the present invention, there is provided a modem apparatus configured to provide wireless network access in accordance with an Orthogonal Frequency Division Multiplexing communications scheme, the apparatus comprising: a hardware subsystem configured in accordance with the Orthogonal Frequency Division Multiplexing communications scheme and comprising baseband processing components and Radio Frequency processing components; wherein the baseband processing components comprise: a first converter component arranged to convert between time and frequency domains in accordance with the Orthogonal Frequency Division Multiplexing communications scheme; and a second converter component arranged to convert between parallel and serial data formats, the second converter being operably coupled to the first converter; the Radio Frequency processing components comprise a cyclic prefix processing component responsive to control information; and a digital interface disposed between the baseband processing components and the RF processing components, the digital interface being operably coupled to the second converter and the cyclic prefix processing component.

The Radio Frequency processing components may comprise a third converter component and the cyclic prefix processing component may be disposed between the third converter component and the digital interface. The third converter component may be a digital-to-analogue converter.

The third converter component may be an analogue-to-digital converter.

The first converter may comprise a Fast Fourier Transform unit. The first converter may additionally or alternatively comprise an Inverse Fast Fourier Transform unit. The second converter may comprise a parallel-to-serial converter. The second converter may additionally or alternatively comprise a serial-to-parallel converter.

The hardware subsystem may comprise a transceiver; the transceiver may comprise the Radio Frequency processing components, the baseband processing components and the digital interface.

The Radio Frequency processing components, the baseband processing components and the digital interface may be arranged to support a transmitter chain.

The Radio Frequency processing components, the baseband processing components and the digital interface may be arranged to support a receiver chain.

The hardware subsystem may be arranged to extract timing data from the control information and the cyclic prefix processing component may be arranged to calculate a position of a cyclic prefix in a received symbol signal.

The baseband processing components may comprise a timing error tracking component; the timing error tracking component may be arranged to communicate the control information to the Radio Frequency processing components. The control information may comprise the timing data.

The timing error tracking component may be arranged to identify a change to a timing error, and to communicate updated timing data to the Radio Frequency processing components in response to detection of the change to the timing error.

The timing error tracking component may determine a timing error using channel delay profile data and/or a reference signal.

The timing error tracking component may be arranged to communicate the timing data to the cyclic prefix processing component at a rate of at least once per subframe of a wireless communications system.

The timing error tracking module may be arranged to communicate the timing data at a subframe boundary.

A symbol to be communicated from the baseband processing components to the Radio Frequency processing components may comprise a plurality of samples; and the second converter may be arranged to communicate a last N samples of the symbol to the Radio Frequency processing components before communication of the remaining samples of the symbol.

The last N samples may correspond to a cyclic prefix to be applied to the symbol.

The Radio Frequency processing components may comprise a buffer having a size corresponding to a maximum possible length of cyclic prefix supported by the Orthogonal Frequency Division Multiplexing communications scheme.

The cyclic prefix processing component may comprise the buffer and the buffer may be operably coupled to a data channel of the digital interface; the buffer may be arranged to store a predetermined number of received samples communicated by the baseband processing components to the Radio Frequency processing components and the predetermined number of samples may correspond to a current cyclic prefix length being employed.

The cyclic prefix processing component may be arranged to access the buffer and append the samples stored therein to remaining samples of a symbol from which the stored samples originate.

The cyclic prefix component may be arranged to operate in accordance with use of a first cyclic prefix length and a second cyclic prefix length; and the cyclic prefix component may be responsive to the control information and may be arranged to select one of the first cyclic prefix length and the second cyclic prefix length in response to at least part of the control information.

The control information may comprise a cyclic prefix length setting.

The cyclic prefix length setting may be updated in response to receipt of a timing advance command.

The hardware sub-system may support Orthogonal Frequency Division Multiplexing according to a Long-Term Evolution wireless communications standard.

According to a second aspect of the present invention, there is provided a communications apparatus comprising the modem apparatus as set forth above in relation to the first aspect of the invention.

According to a third aspect of the present invention, there is provided a user equipment unit comprising the communications apparatus as set forth above in relation to the second aspect of the invention.

According to a fourth aspect of the present invention, there is provided a communication system comprising the modem as set forth above in relation to the first aspect of the invention.

According to a fifth aspect of the present invention, there is provided a method of processing a cyclic prefix in a modem apparatus configured to provide wireless network access in accordance with an Orthogonal Frequency Division Multiplexing communications scheme, the method comprising: baseband processing components converting signals between time and frequency domains in accordance with the Orthogonal Frequency Division Multiplexing communications scheme; baseband processing components converting data between parallel and serial data formats; Radio Frequency processing components processing a cyclic prefix data in response to control information; and a digital interface interfacing between the baseband processing components and the Radio Frequency processing components to communicate data between a node associated with the parallel and serial data format conversion and a node associated with the cyclic prefix processing.

It is thus possible to provide an apparatus, method and system that reduces the data transfer across the digital interface between the baseband IC and the RF IC. The reduction in data transfer can be as much as a 7% reduction. This, in turn, reduces the power consumption attributable to the digital interface as well as latency across the digital interface. By maintaining separate baseband and RF ICs, it is also possible to support separate product development of baseband and RF ICs and a modular architecture. Such an approach can support the use of separate RF ICs for some applications. Additionally, the above approach reduces wafer "real estate" requirements for a wireless transmitter, receiver and/or transceiver.

BRIEF DESCRIPTION OF THE DRAWINGS

At least one embodiment of the invention will now be described, by way of example only, with reference to the accompanying drawings, in which.

DETAILED DESCRIPTION OF THE INVENTION

Throughout the following description identical reference numerals will be used to identify like parts.

Figure 1:
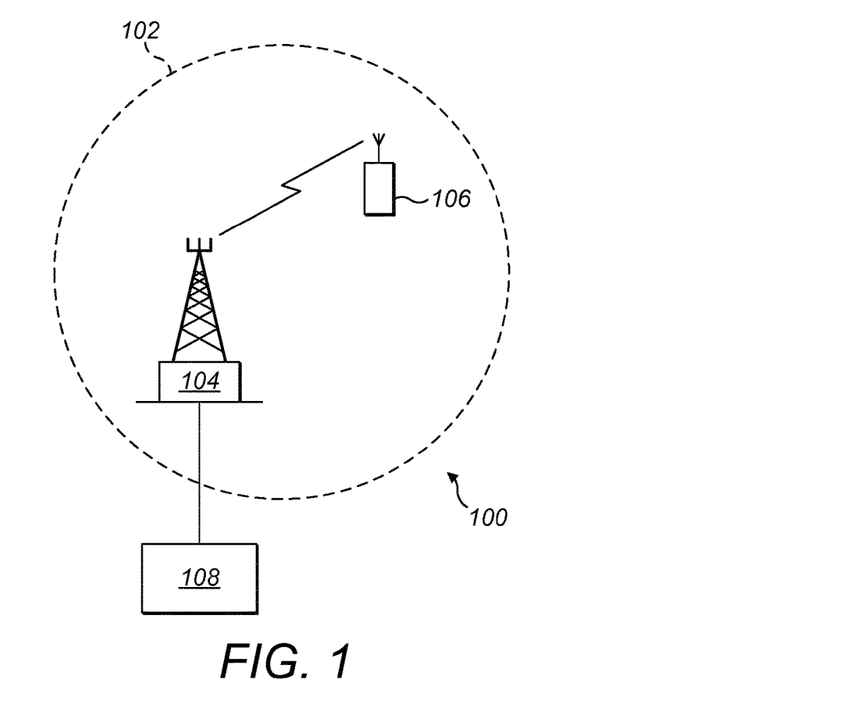
FIG. 1 is a schematic diagram of a user equipment unit operating in a part of a communications network.

Referring to FIG. 1, in a wireless communications system, for example a Long Term Evolution (LTE) communications system 100, a communications network is supported by a plurality of cells arranged to provide wireless communications access over a geographic region. In this example, only a single cell is shown for the sake of simplicity and conciseness of description. However, the skilled person will appreciate that a greater number of cells is usually deployed throughout the communications network. Nevertheless, a cell 102 is supported by a base station, referred to as an evolved Node B (eNode B) 104 in the context of the LTE communications system 100. The eNode B 104 is capable of communicating wirelessly with a communications apparatus, for example a User Equipment (UE) unit 106, over an air interface. The eNode B 104 is operably coupled to an Evolved Packet Core (EPC) 108. However, since the examples set forth herein concern the UE unit 106, for the sake of clarity and conciseness of description, further details of the wireless communications network infrastructure will not be described herein. Furthermore, whilst the examples set forth herein are described in the context of the LTE communications system 100, the skilled person will appreciate that the examples are applicable to other kinds of communications networks that operate in accordance with the Orthogonal Frequency Division Multiplexing (OFDM) communications scheme, for example communications networks operating in accordance with the Worldwide Interoperability for Microwave Access (WiMAX) communications standard and the WiFi standard (IEEE 802.11).

Figure 2:
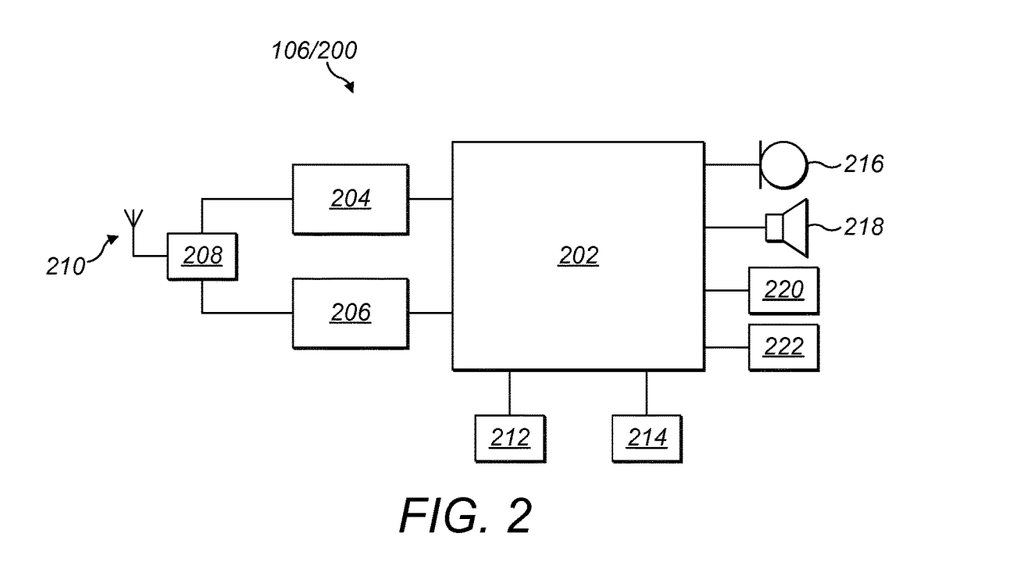
FIG. 2 is a schematic diagram of a user equipment device of FIG. 1 constituting an embodiment of the invention.

Turning to FIG. 2, the user equipment (UE) device 106/200 operating in an LTE communications system, comprises a processing resource 202, the processing resource 202 being, in this example, a chipset of a cellular communications terminal. The processing resource 202 is coupled to a transmitter chain 204 and a receiver chain 206, the transmitter and receiver chains 204, 206 being coupled to a duplexing apparatus 208. The duplexing apparatus 208 is coupled to an antenna 210.

The UE unit 200 also possesses a volatile memory, for example a RAM 212, and a non-volatile memory, for example a ROM 214, each coupled to the processing resource 202. The processing resource 202 is also coupled to a microphone 216, a speaker unit 218, a keypad 220 and a display 222. The skilled person should appreciate that the architecture of the UE unit 200 described above comprises other elements, for example multiple antennae, but such additional elements have not been described in detail herein for the sake of preserving conciseness and clarity of description.

The transmitter chain 204 and the receiver chain 206 are supported by a hardware subsystem. For some applications, only the transmitter chain 204 or the receiver chain 206 may be employed. However, in the present example, the hardware subsystem supports a transceiver, which is part of a modem of the UE unit 200. The modem is configured to provide wireless network access in accordance with the OFDM communications scheme, for example as defined in the LTE standard. In the examples set forth herein, the term modem should be understood to embrace any suitable signal modulation and/or demodulation apparatus capable of supporting operation in accordance with the OFDM scheme. The hardware subsystem is a collection of hardware and/or software elements that contributes, with other subsystems, to the transmitter chain 204 and/or a receiver chain 206.

Figure 3:
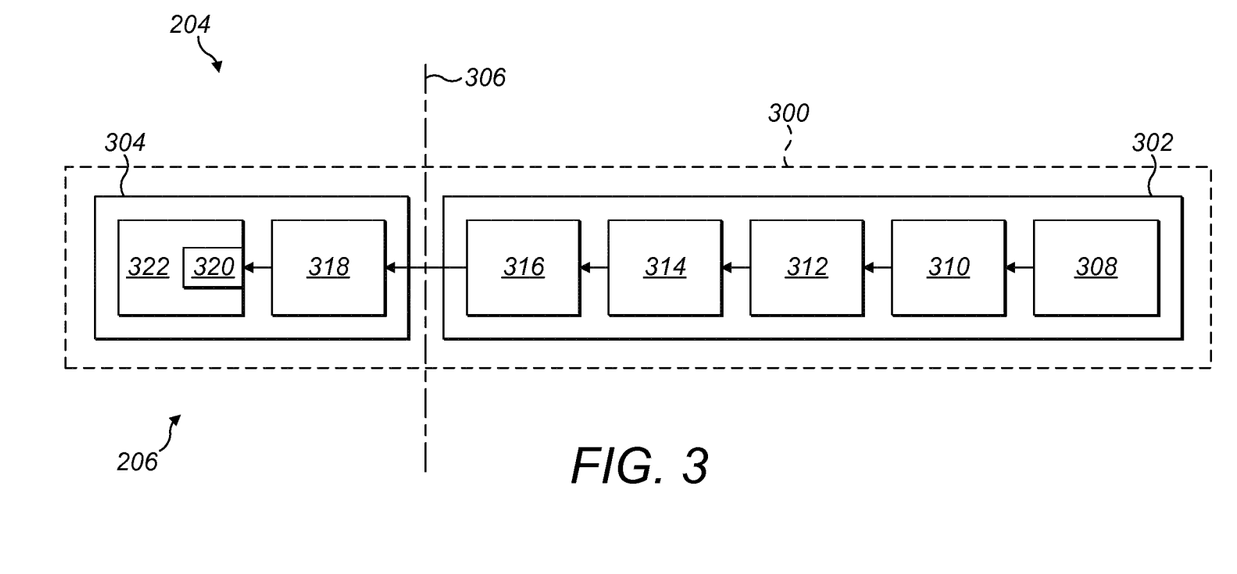
FIG. 3 is a schematic diagram of a transmit path of a hardware subassembly of a modem apparatus constituting a further embodiment of the invention.

Referring to FIG. 3, the hardware subsystem 300, which is configured in accordance with the OFDM communications scheme, comprises a baseband Integrated Circuit (IC) 302 and a Radio Frequency (RF) IC 304 to support the transmitter chain 204. A digital interface 306 is disposed between the baseband IC 302 and the RF IC 304 for communication therebetween. The baseband IC 302 is an example baseband processing components and the RF IC 304 is an example of RF components. These are functional components, arranged in stages. For a receiver chain, these baseband processing components process an incoming OFDM signal after it has been translated from being centred about a carrier frequency to being about a baseband range of frequencies, i.e. to a range of frequencies in which the carrier frequency has been remove. For a transmitter chain, the opposite applies, namely that a signal in the baseband range of frequencies, prior to being translated to the analogue domain and up-converted onto a carrier frequency, is processed by these components. For a receiver chain, the RF processing components are functional components that are arranged in stages to down-convert a received OFDM signal down to the baseband range of frequencies. For a transmitter chain, these are functional components arranged to modulate a received digital signal centred about a baseband range of frequencies onto a carrier signal. The digital interface 306 is an interface between the baseband processing components and the RF processing components, which is subject to minimal specification under the LTE standard and provided to communicate digital data, for example, between the baseband processing components and the RF processing components in support of the OFDM communications scheme.

The transmitter chain 204 for a Single-Carrier Frequency Division Multiple Access waveform specified for the LTE communications system is supported by the baseband IC 302, the RF IC 304 and the digital interface 306 in the following manner. The baseband IC 302 comprises upstream baseband processing, designated by upstream baseband processing unit 308, which includes, inter alia, Cyclic Redundancy Check (CRC) coding, channel coding, rate matching, serial-to-parallel conversion, modulation component and a Digital Fourier Transform (DFT). As these, and other, components of the remainder of the transmitter chain 204 are set out in the LTE standard and would, in any event, be readily understood by the skilled person and have no bearing on the understanding of the inventive concepts expounded in the examples set forth herein, they will not be described in further detail herein. However, for the sake of completion, these elements have just been mentioned in relation to FIG. 3. An output of the upstream baseband processing unit 308 is operably coupled to an input of a subcarrier mapping unit 310. An output of the subcarrier mapping unit 310 is operably coupled to an input of an unused subcarrier zero padding unit 312, which has an output operably coupled to a first converter arranged to support conversion of signals between the time and frequency domains in accordance with the SC-FDMA communications scheme, for example an input of an N-point Inverse Fast Fourier Transform (IFFT) unit 314. Outputs of the IFFT unit 314 are respectively operably coupled to a second converter, of a different nature to the first converter mentioned above, and arranged to support signal conversion between parallel and serial data formats. For example, the IFFT unit 314 is operably coupled to multiple inputs of a parallel-to-serial converter 316. In relation to the subcarrier mapping unit 310 and the subcarrier zero padding unit 312, the skilled person will appreciate that in accordance with 3GPP LT 36.211, 5.3 of the LTE standard, the functionality of these units can be performed by a resource element mapper unit (not shown).

In this example, the RF IC 304 comprises a cyclic prefix processing unit, for example a cyclic prefix addition unit 318 comprising a prefix data store or buffer (not shown). The buffer is operably coupled to a data channel (not shown) of the digital interface 306 and the size of the buffer is sufficient to store a maximum possible length of cyclic prefix supported by the OFDM communication scheme. An output of the cyclic prefix addition unit 318 is operably coupled to an input of a third converter unit, for example a digital-to-analogue converter unit 320, having an output operably coupled to a remainder of the RF processing circuitry 322 of the RF IC 304, which includes up-conversion components and associated amplification components. As these, and other, components of the remainder of the RF processing circuitry 322 would be readily understood by the skilled person and have no bearing on the understanding of the examples set forth herein, they will not be described in further detail herein.

An output of the parallel-to-serial converter 316 of the baseband IC 302 is capable of communicating data to the cyclic prefix addition unit 318 of the RF IC unit 304 via the digital interface 306, the cyclic prefix processing unit being disposed between the digital interface 306 and the third converter unit.

Figure 4:
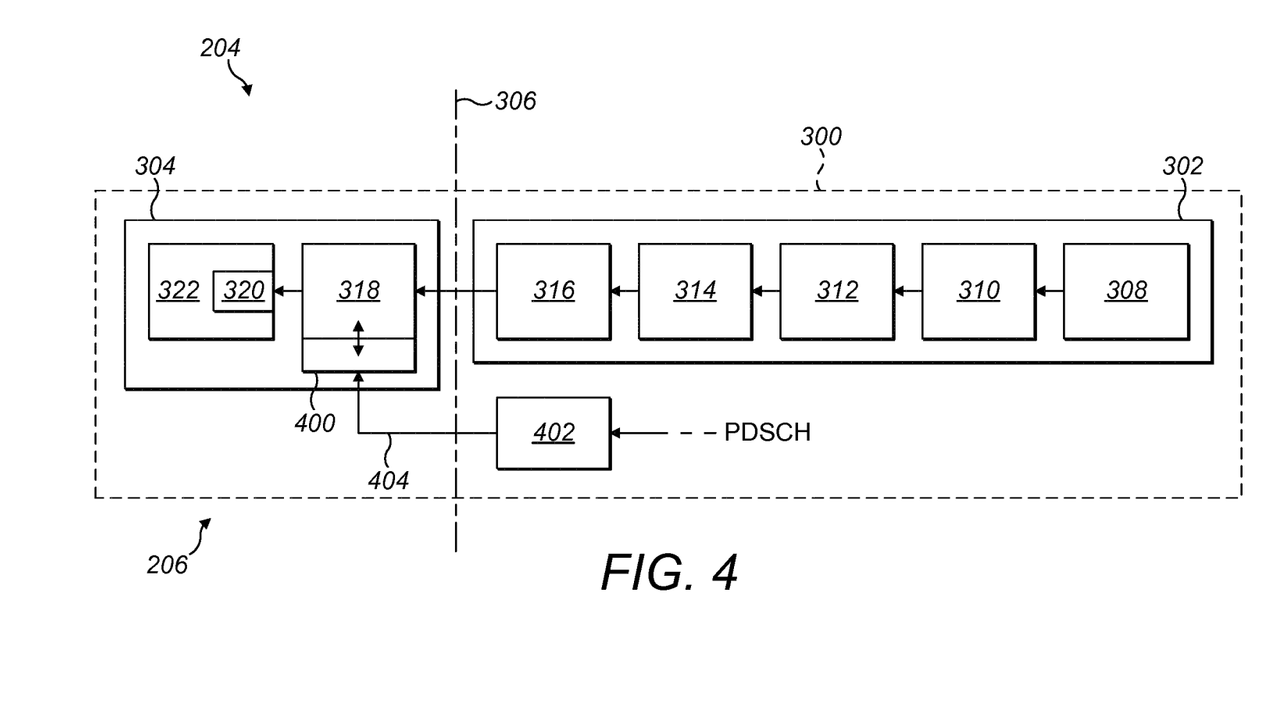
FIG. 4 is a schematic diagram of the subassembly of FIG. 3 in greater detail.

Turning to FIG. 4, the RF IC 304 also comprises an uplink cyclic prefix register 400 for storing the length of the cyclic prefix used by the UE unit 106 for uplink communications. The prefix addition unit 318 is capable of accessing the uplink cyclic prefix register 400 when necessary. The hardware subsystem 300 comprises a protocol software component 402, which is capable of writing to the uplink cyclic prefix register 400 via an uplink/downlink control data interface 404 of the digital interface 306. The protocol software component 402 is operably coupled to the Physical Downlink Shared CHannel (PDSCH).

Figure 5:
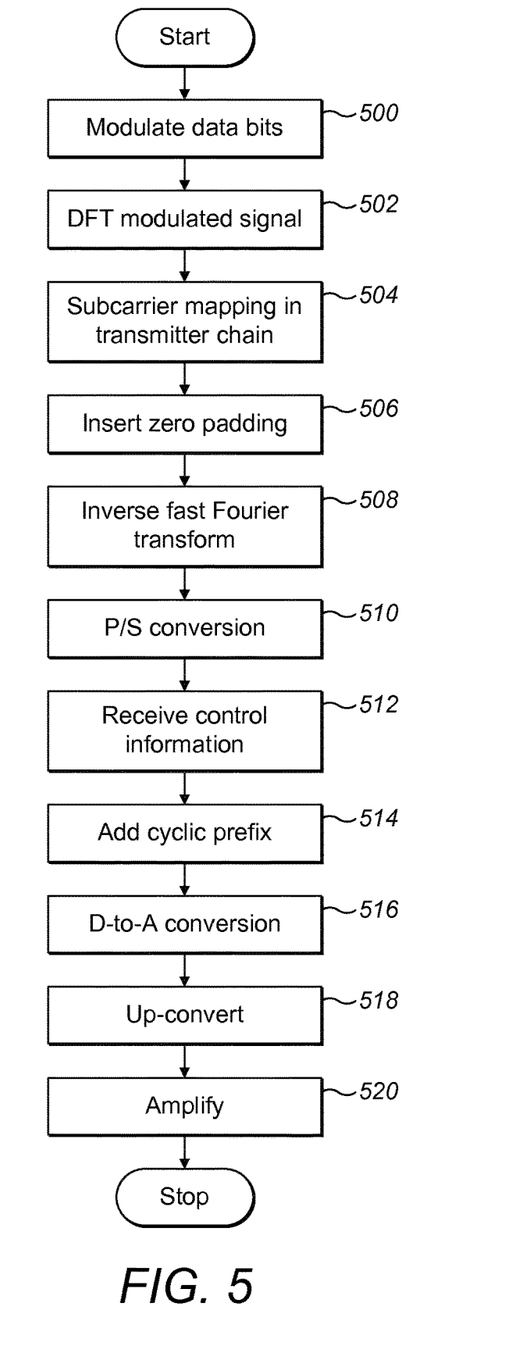
FIG. 5 is a flow diagram of a method of processing a cyclic prefix employed by the modem apparatus of FIG. 3.

In operation, (FIG. 5), a block of M data bits is Quadrature Amplitude Modulation (QAM) modulated (Step 500) onto a carrier signal at a zero centre frequency using a data mapper (not shown) and a waveform generator (also not shown) of the upstream baseband processing unit 308 of the baseband IC 302. The upstream baseband processing unit 308 then subjects the modulated carrier signal to a discrete Fourier transform (Step 502) by a digital Fourier transform unit (not shown) to generate a set of M equally-spaced adjacent subcarriers of amplitude and phase that correspond to the QAM waveform repetitively, occupying a bandwidth of M×15 kHz in accordance with the LTE standard. The set of adjacent subcarriers is then mapped (Step 504) by the subcarrier mapping unit 310 onto part of a larger set of N subcarriers that span the full bandwidth of the LTE standard. After mapping, the full set of N subcarriers is subjected to an unused subcarrier zero padding process (Step 506) by the subcarrier zero padding unit 312 in order to comply with FFT size requirements, and then the padding-processed subcarriers are subjected to an inverse fast Fourier transform (Step 508) by the IFFT unit 314 to generate parallel time-domain digital waveforms. The digital time domain waveforms are converted (Step 510) from a parallel format to a serial format by the parallel-to-serial converter unit 316 to yield a serial digital waveform that is communicated to the RF IC 304 via the digital interface 306. As the cyclic prefix needs to be created from the last N samples of the serial digital waveform to be sent to the RF IC 304, the data that would be used to generate the cyclic prefix is read out of the parallel-to-serial converter 316 and sent first, i.e. before the rest of the serial digital waveform, from the baseband IC 302 to the RF IC 304. Subsequently the remaining non-cyclic prefix-related data of the serial digital waveform, is sent from the baseband IC 302 to the RF IC 304. The last N-samples of the serial digital waveform are therefore received by the RF IC 304 before the rest of the samples of the serial digital waveform and processed by the cyclic prefix addition unit 318. In this respect, as the LTE standard supports more than one length of cyclic prefix, and so the cyclic prefix addition unit 318 needs to be provided with the length of the uplink cyclic prefix to be used in order to perform the above processing of the samples of the serial digital waveform. Consequently, the protocol software component 402 has access to System Information Block data via the PDSCH, in particular SystemInformationBlockType2 data, from which the protocol software component 402 extracts the length of the uplink cyclic prefix to be used. The protocol software component 402 then writes the length of the uplink cyclic prefix being used to the uplink cyclic prefix register 400 via the uplink/downlink control data interface 404. The length of the uplink cyclic prefix to be used is then retrieved (Step 512) from the uplink cyclic prefix register 400 by the cyclic prefix addition unit 318. The cyclic prefix addition unit 318 then, on a per symbol basis, stores in the buffer a respective copy of the last N-samples of the serial digital waveform of a given symbol being received, the amount of data stored being selected in accordance with the retrieved length of the uplink cyclic prefix from the uplink cyclic prefix register 400. Thereafter, once the samples sent from the baseband IC 302 have been completely received by the RF IC 304, the stored part of the received symbol is retrieved from the buffer by the cyclic prefix addition unit 318 and appended (Step 514) to the end of the last sample received in respect of the given symbol in order to complete the given symbol. In this example, as the samples of the symbol are received by the cyclic prefix addition unit 318, the samples are converted (Step 516) from the digital domain to the analogue domain by the digital-to-analogue converter 320 and then the analogue signal output is up-converted (Step 518) by the up-converter mentioned above in relation to the remainder of the RF processing circuitry 322 to form an RF signal. Consequently, in this example, the symbol is rebuilt and further processed "on-the-fly", because once the samples, apart from the last N samples, have been passed downstream to the digital-to-analogue converter 320 and other processing components, the last N samples stored in the buffer are effectively appended to the stream of samples and passed to the digital-to-analogue converter in a like manner to the preceding samples relating to the symbol. This thereby avoids transmitting the cyclic prefix samples effectively twice between the baseband IC 302 and the RF IC 304 and hence reduces data bandwidth usage across the digital interface 306. Of course, other implementation possibilities are conceivable, for example the buffer can be enlarged to store all samples of a symbol and the cyclic prefix addition unit 318 can be configured to firstly store the last N samples in respect of buffer storage locations relating to the beginning and the end of the symbol and then populate the storage locations in-between the two instances of the last N samples with the remaining samples received by the cyclic prefix addition unit 318. Thereafter, once the symbol has been reconstructed, including the appended cyclic prefix, the samples are then converted (Step 516) from the digital domain to the analogue domain by the digital-to-analogue converter 320 and then the analogue signal output is up-converted (Step 518) by the up-converter mentioned above in relation to the remainder of the RF processing circuitry 322 to form an RF signal. The up-converted RF signal is then amplified (Step 520) by the power amplifier also mentioned above in relation to the remainder of the RF processing circuitry 322 before being applied to the duplexer 208 prior to emission by the antenna 210.

It should be noted that, where a handover is instructed between eNode Bs, the protocol software component 402 extracts cyclic prefix length information in respect of a target eNode B of the handover procedure, the cyclic prefix length information being obtained during the synchronisation procedure between the UE unit 200 and the target eNode B. In a like manner to that described above, the length of the uplink cyclic prefix being used by the target eNode B is written to the uplink cyclic prefix register 400 via the uplink/downlink control data interface 404.

It should be appreciated that, in the current LTE standard, multiple lengths of cyclic prefix exist, the cyclic prefix selected being dictated by propagation consideration. In this example, the cyclic prefix processing unit is responsive to the content of the uplink cyclic prefix register 400, which contains an indication of which of the available cyclic prefix lengths the modem should use for transmission of data. The cyclic prefix processing unit stores data in the buffer to be used to complete a symbol, because the last N-samples of the symbol are sent in advance by the baseband IC 302 and now (in addition to prefixing the samples of the symbol) require appending to the end of the remaining samples of the symbol received.

In order to ensure that the cyclic prefix stored in the uplink cyclic prefix register 400 is current, the protocol software component 402 can be arranged to refresh the cyclic prefix length information stored in the uplink cyclic prefix register 400 in response to receipt by the UE unit 200 of a timing advance command from a current eNode B.

Figure 6:
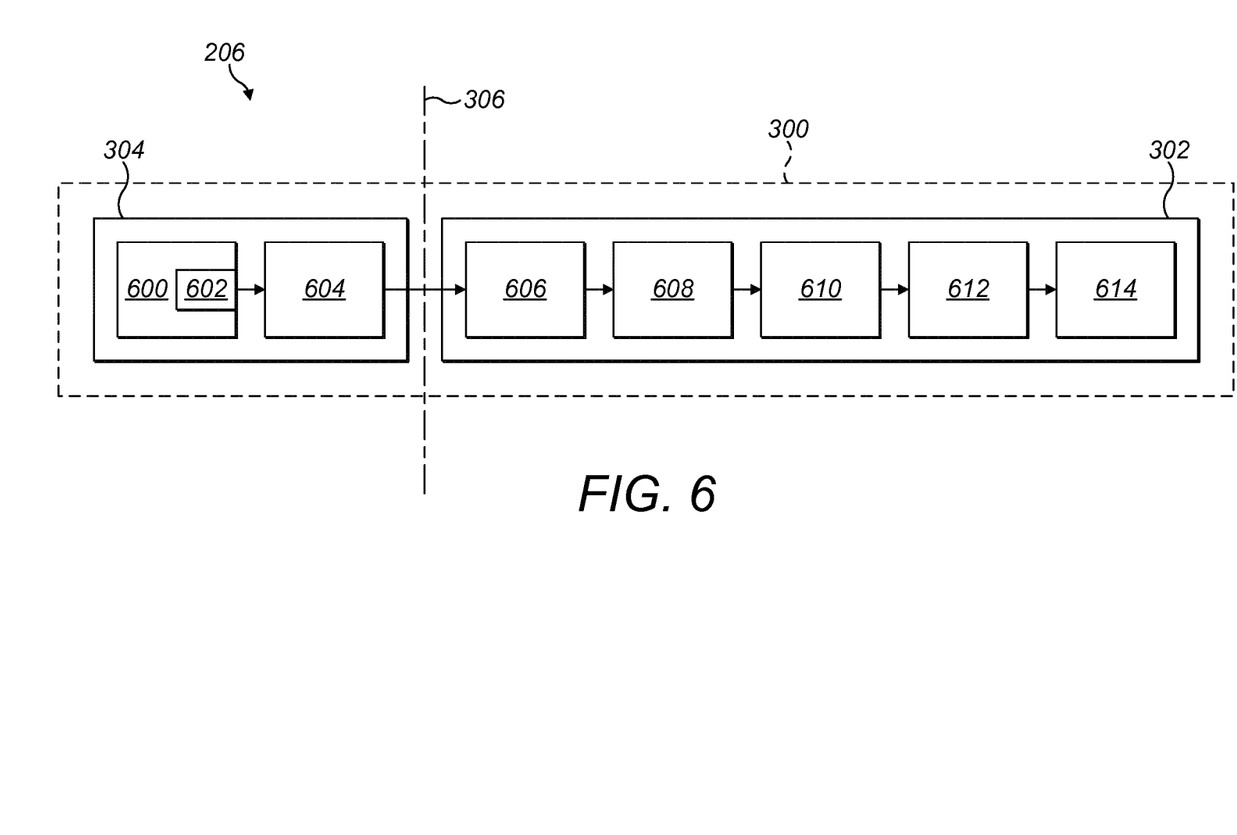
FIG. 6 is a schematic diagram of a receive path of a hardware subassembly of a modem apparatus constituting another embodiment of the invention.

Referring to FIG. 6, the receiver chain 206 is also supported by the baseband IC 302, the RF IC 304 and the digital interface 306 in the following manner. The RF IC 304 comprises upstream RF processing, designated by upstream RF processing unit 600, which includes filtering, amplification, frequency conversion and gain control. As these, and other, components of the upstream RF processing unit 600 would be readily understood by the skilled person and have no bearing on the understanding of the inventive concepts expounded in the examples set forth herein, they will not be described in further detail herein. The upstream RF processing unit 600 is operably coupled to another example of the third converter unit, for example an analogue-to-digital converter 602, having an output operably coupled to the cyclic prefix processing unit, for example a cyclic prefix removal unit 604. Although in this example, uplink and downlink processing of the cyclic prefix is performed by the cyclic prefix processing unit, the skilled person will appreciate that the processing can be performed by separate processing elements.

The baseband IC 302 comprises another example of the second converter arranged to convert between parallel and serial data formats, for example a serial-to-parallel converter unit 606, having an output that is operably coupled to another example of the first converter arranged to convert between time and frequency domains in accordance with the OFDM communications scheme, for example an input of a Fast Fourier Transform (FFT) unit 608. An output of the FFT unit 608 is operably coupled to an input of a subcarrier extraction unit 610. An output of the subcarrier extraction unit 610 is operably coupled to an input of a subcarrier demapping unit 612, an output of the subcarrier mapping unit 612 being operably coupled to a remainder of the receive chain 614 configured in accordance with the LTE standard, some of which will be described in greater detail later herein. In relation to the subcarrier extraction unit 610 and the subcarrier mapping unit 612, the skilled person will appreciate that, in accordance with 3GPP LT 36.211, 6.3 of the LTE standard, the functionality of these units can be performed by a resource element demapper unit (not shown).

An output of the cyclic prefix removal unit 604 is capable of communicating with an input of the serial-to-parallel converter unit 606 via the digital interface 306. In this respect, the digital interface 306 is located between the cyclic prefix removal unit 604 and the serial-to-parallel converter unit 606, and hence between the RF IC 304 and the baseband IC 302. Furthermore, the cyclic prefix processing unit is disposed between the digital interface 306 and the third converter unit.

Figure 7:
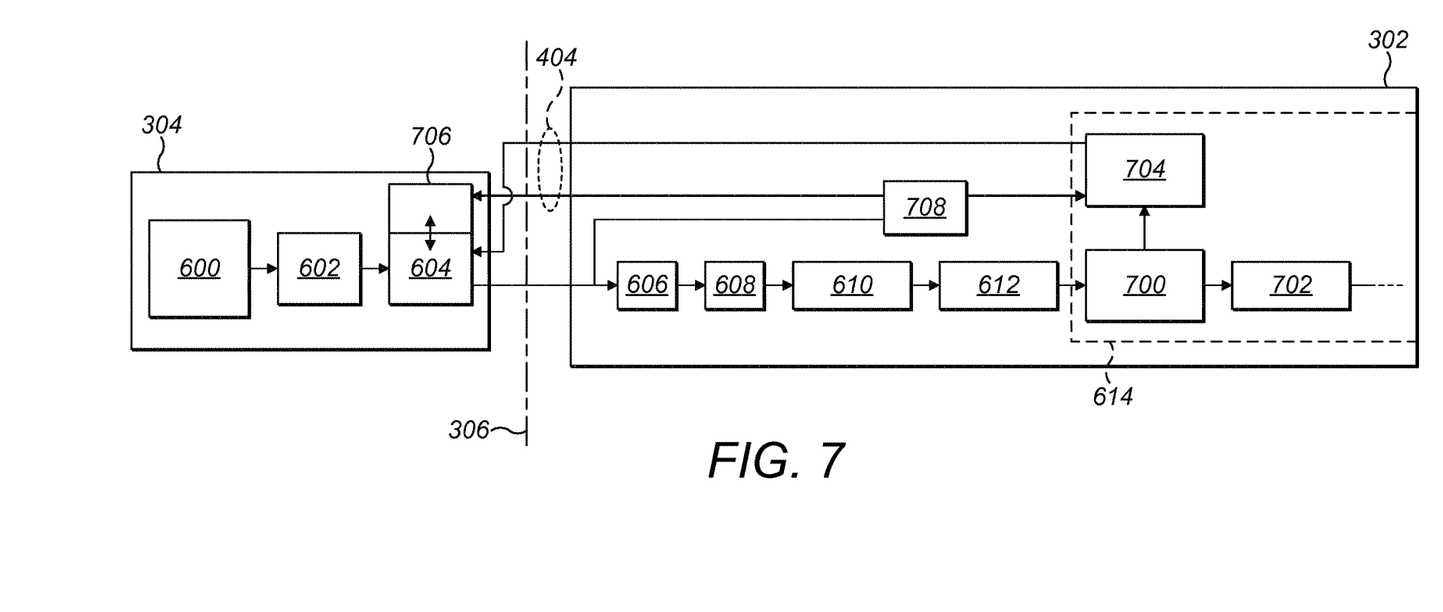
FIG. 7 is a schematic diagram of the subassembly of FIG. 3 in greater detail.

Turning to FIG. 7, the remainder of the receiver chain 614 comprises a channel estimation unit 700 having an input operably coupled to an output of the subcarrier demapping unit 612. A first output of the channel estimation unit 700 is operably coupled to an input of a channel equalisation unit 702, an output of which is operably coupled to other functional components of the receiver chain 206, which includes demodulation, serial-to-parallel conversion, de-rate matching and channel decoding. As these, and other, components of the remainder of the receiver chain 614 would be readily understood by the skilled person and have no bearing on the understanding of the inventive concepts expounded in the examples set forth herein, they will not be described in further detail herein. A second output of the channel estimation unit 700 is operably coupled to a first input of a timing error tracking unit 704. The timing error tracking unit 704 is capable of communicating with the cyclic prefix processing unit, which in this example is the cyclic prefix removal unit 604, via the uplink/downlink control data interface 404 of the digital interface 306. The RF IC 304 comprises a downlink cyclic prefix register 706, which the cyclic prefix removal unit 604 is able to access. A cell search module 708 of the baseband IC 302 is operably coupled to the data channel of the digital interface 306, for example at the input of the baseband IC 302, the cell search module 708 also being operably coupled to the timing error tracking unit 704. Additionally, the cell search module 708 is capable of writing to the downlink cyclic prefix register 706 via the uplink/downlink control data interface 404 of the digital interface 306. The downlink cyclic prefix register 706 also stores the size of the FFT unit 608.

In operation (FIG. 8), an RF signal, received (Step 800) through the antenna 210 of the UE unit 200 and the duplexer 208, is down-converted (Step 802) by the upstream RF processing unit 600 of the RF IC 304 to an analogue baseband signal and the analogue baseband signal is communicated to the analogue-to-digital converter 602 in order to convert (Step 804) the analogue baseband signal to the digital domain. The analogue-to-digital converter 602 therefore generates a digital signal in response to the analogue baseband signal received, the digital signal constituting a train of symbols arranged in accordance with a frame structure as specified in the LTE standard, each frame comprising a plurality of symbols. According to the LTE standard, the symbols are each prefixed with a cyclic prefix, which serves as a guard interval and to reduce the effects of inter-symbol interference. As part of processing of the digital signal, according to the LTE standard, the cyclic prefixes require removal (Step 806).

Figure 8:
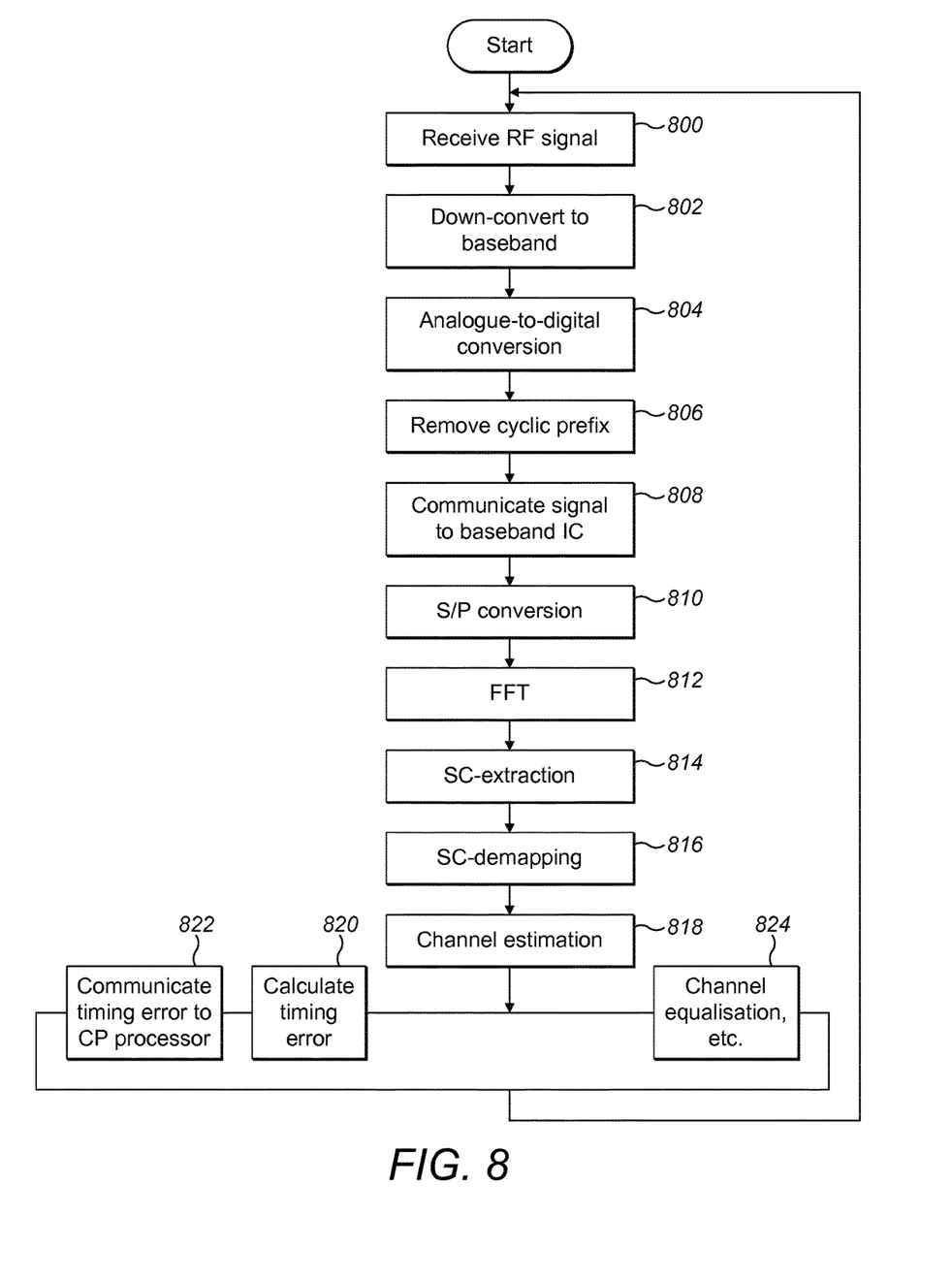
FIG. 8 is a flow diagram of a method of processing a cyclic prefix employed by the modem apparatus of FIG. 3.

In this respect, the cyclic prefix removal unit 604 accesses the downlink cyclic prefix register 706 in order to determine the length of the downlink cyclic prefix. However, the downlink cyclic prefix register 706 needs, inter alia, to contain the length of the downlink cyclic prefix for use in removing the cyclic prefix. In this respect, the cell search module 708 receives downlink data communicated between the RF IC 304 and the baseband IC 302 over the data interface of the digital interface 306. The cell search module 708 initiates a cell search procedure in accordance with the LTE standard. Particular to this downlink aspect of the embodiment, the cell search module 708 uses downlink synchronisation channels in order to find a primary synchronisation signal and then a secondary synchronisation signal within the primary synchronisation signal in order to detect the length of the downlink cyclic prefix being used. Once detected, the length of the downlink cyclic prefix is written by the cell search module 708 to the downlink cyclic prefix register 706 via the uplink/downlink control data interface 404.

The cyclic prefix removal unit 604 also receives control data, comprising sample position number data, constituting timing data, from the timing error tracking unit 704. The cyclic prefix removal unit 604 uses this timing data in order to locate accurately, in terms of a sample position number, such as an $n^{th}$ sample, the optimal position of the start of signal energy with respect to the cyclic prefix in the presence of inter-symbol interference from a preceding symbol. In this regard, this sample position number data, the stored size of the FFT unit 608, and the accessed length of the downlink cyclic prefix, can be used, with any suitable cyclic prefix removal algorithm used in baseband ICs, in the RF IC 304 to serve as the cyclic prefix removal unit 604. The cyclic prefix removal unit 604 thus uses the sample position number data, the FFT size data and the length of the downlink cyclic prefix to remove the cyclic prefix, for example to omit purposely to communicate the cyclic prefix to the baseband IC 302. With the cyclic prefix removed (Step 806), the unprefixed symbols are communicated (Step 808) to the baseband IC 302 via the digital interface 306. As the symbols are received by the baseband IC 302 as a serial data stream, the serial symbols are converted (Step 810) to parallel data by the serial-to-parallel converter 606 before being communicated to the FFT unit 608. The FFT unit 608 then applies a Fast Fourier Transform algorithm (Step 812) to the symbol bearing signal, which is in the time domain, to convert the time domain signal to the frequency domain, i.e. to yield a frequency signal. The output of the FFT unit 608 is then communicated to the subcarrier extraction unit 610 in order to remove (Step 814) unused guard carriers in accordance with the LTE standard. Thereafter, the signal output by the subcarrier extraction unit 610 is communicated to the subcarrier demapping unit 612, which performs subcarrier demapping (Step 816) in order to extract subcarrier resource elements that the UE unit 200 needs to decode. The demapped signal is then passed to the remainder of the receive chain 614, where the timing error tracking unit 704 determines (Step 820) any error in identification of the start of the signal energy of the symbol. This error can be calculated in a number of ways. For example, a coarse estimate of the start of the symbol is generated and communicated by the cell search module 708 to the timing error tracking unit 704. The initial estimate is communicated by the timing error tracking unit 704 to the cyclic prefix removal unit 604 in terms of a sample position number. The accuracy of the initial estimate can then be improved upon using any suitable known techniques. For example, the timing error tracking unit 704 can use a reference signal obtained directly from the output of the subcarrier demapping unit 612, the reference signal resulting from use of the initial estimated sample position number. Alternatively, and as employed in this example, the accuracy of the initial estimate can be improved by the timing error tracking unit 704 obtaining the reference signal from the subcarrier demapping unit 612 but via the channel estimation unit 700, as well as channel delay profile data generated by the channel estimation unit 700. The timing error tracking unit 704 then determines a revised sample position number. Once calculated, the sample position number data is communicated (Step 822) to the cyclic prefix processing unit 604 as control information for use and storage in the downlink cyclic prefix register 706. In this example, the timing error tracking unit 704 communicates the sample position number data to the cyclic prefix processing unit at a rate of at least once per subframe of the LTE system. In this example, the sample position number is communicated in synchronism with a subframe boundary, i.e. in synchronism with the boundary between subframes.

The output of the channel estimation unit 700 is also subjected to channel equalisation (Step 824) by the channel equalisation unit 702 prior to any further processing of the received signal by the remainder of the receiver chain 614. The above process (Steps 800 to 824) is repeated whilst the RF signal is being received in order to continually process the received RF signal.

As can be seen, the cyclic prefix processing unit 604 is disposed in the RF IC 304 as opposed to the baseband IC 302, the latter being the established location for cyclic prefix processing. This thereby avoids transmitting the cyclic prefix over the digital interface 306 and hence reduces data bandwidth usage across the digital interface 306.

The skilled person should appreciate that the above-described implementations are merely examples of the various implementations that are conceivable within the scope of the appended claims. Indeed, the skilled person should appreciate that descriptions herein of the transmitter chain 204 and the receiver chain 206 in combination are not intended to be limiting in the sense that a modem can comprise only the transmitter chain 204 and the receiver chain 206, and a modem comprising one or the other of the transmitter chain 204 and the receiver chain 206 is contemplated.

Similarly, various references have been made herein to "converter" units. The precise meaning of this term differs depending upon specific context. However, at a general level, a converter unit is a unit that converts an input from a first domain to a second domain, for example from an analogue domain to a digital domain, such as an analogue-to-digital converter. Another example of the converter component is a digital to analogue converter. However, formats should also be considered as "domains", for example parallel and serial data formats should be considered as domains, and in this regard parallel-to-serial converters and serial-to-parallel converters are examples of "converters" between these domains. Further examples of domains are frequency and time domains, and in this regard the FFT and IFFT units are examples of "converters" between frequency and time domains.

Although, in the above examples, reference has been made to two cyclic prefix lengths only as defined in the LTE standard. It should be appreciated that the control information can support communications standards that employ more than two prefix lengths, for example three of more different lengths of cyclic prefix. Alternatively, where a single cyclic prefix is employed in the communication system, the cyclic prefix length can be stored locally in the RF IC 304 without the need for specific communication from the BB IC 302.

In relation to the digital interface, at a functional level, it should be understood that the digital interface interfaces between the baseband processing components and the Radio Frequency processing components to support communication of data between a notional node associated with the parallel-to-serial converter or the serial-to-parallel converter and a notional node associated with the input of output of the cyclic prefix processing unit, depending upon whether reference is being made to the transmitter chain or the receiver chain.

Throughout the examples described about, the term "unit" has been used in relation to components of the baseband IC 302 and the RF IC 304. However, the skilled person should appreciate that the terms "unit" and "component" can be used interchangeably herein.

For the avoidance of doubt, use of the term "downlink" refers to communications from an eNode B to a UE unit. The UE unit 200 therefore possesses, in the examples set forth herein, a downlink receiver chain. Similarly, use of the term "uplink" refers to communications from a UE unit to an eNode B. The UE unit 200 therefore possesses, in the examples set forth herein, an uplink transmitter chain.

The systems and methods of the above embodiments may be implemented in a computer system (in particular in computer hardware or in computer software) or in specifically manufactured or adapted integrated circuits, in addition to the structural components and user interactions described.

The methods of the above embodiments may be provided as computer programs or as computer program products or computer readable media carrying a computer program which is arranged, when run on a computer or other processor, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While specific examples of the invention have been described above, the skilled person will appreciate that many equivalent modifications and variations are possible. Accordingly, the exemplary embodiments of the invention set forth above are considered to be illustrative and not limiting. Various changes to the described embodiments may be made without departing from the spirit and scope of the invention.

The invention claimed is:

1. A modem apparatus configured to provide wireless network access in accordance with an Orthogonal Frequency Division Multiplexing communications scheme, the modem apparatus comprising:
   a hardware subsystem configured in accordance with the Orthogonal Frequency Division Multiplexing communications scheme and comprising baseband processing components and Radio Frequency (RF) processing components; wherein
   the baseband processing components comprise:
      a first converter component arranged to convert between time and frequency domains in accordance with the Orthogonal Frequency Division Multiplexing communications scheme; and
      a second converter component arranged to convert between parallel and serial data formats, the second converter being operably coupled to the first converter;
   the RF processing components comprise a cyclic prefix processing component responsive to control information in order to process cyclic prefix data; and
   a digital interface disposed between the baseband processing components and the RF processing components, the digital interface being operably coupled to the second converter and the cyclic prefix processing component.

2. The modem apparatus according to claim 1, wherein the RF processing components comprise a third converter component and the cyclic prefix processing component is disposed between the third converter component and the digital interface.

3. The modem apparatus according to claim 2, wherein the third converter component is a digital-to-analogue converter or an analogue-to-digital converter.

4. The modem apparatus according to claim 1, wherein the hardware subsystem comprises a transceiver, the transceiver comprising the RF processing components, the baseband processing components and the digital interface.

5. The modem apparatus according to claim 1, wherein the RF processing components, the baseband processing components and the digital interface are arranged to support at least one of a transmitter chain and a receiver chain.

6. The modem apparatus according to claim 1, wherein the hardware subsystem is arranged to extract timing data from the control information and the cyclic prefix processing component is arranged to calculate a position of a cyclic prefix in a received symbol signal.

7. The modem apparatus according to claim 6, wherein the baseband processing components comprise a timing error tracking component, the timing error tracking component being arranged to communicate the control information to the RF processing components, the control information comprising the timing data.

8. The modem apparatus according to in claim 6, wherein the baseband processing components comprise a timing error tracking component, the timing error tracking component being arranged to identify a change to a timing error, and to communicate updated timing data to the RF processing components in response to detection of the change to the timing error.

9. The modem apparatus according to claim 6, wherein the baseband processing components comprise a timing error tracking component, the timing error tracking component being arranged to communicate the timing data to the cyclic prefix processing component at a rate of at least once per subframe of a wireless communications system.

10. The modem apparatus according to claim 9, wherein the baseband processing components is arranged to communicate the timing data at a subframe boundary.

11. The modem apparatus according to claim 5, wherein a symbol to be communicated from the baseband processing components to the RF processing components comprises a plurality of samples; and
   the second converter is arranged to communicate a last N samples of the symbol to the RF processing components before communication of the remaining samples of the symbol.

12. The modem apparatus according to claim 5, wherein the RF processing components comprise a buffer having a size corresponding to a maximum possible length of cyclic prefix supported by the Orthogonal Frequency Division Multiplexing communications scheme.

13. The modem apparatus according to claim 12, wherein the cyclic prefix processing component comprises the buffer and the buffer is operably coupled to a data channel of the digital interface, the buffer being arranged to store a number of received samples communicated by the baseband processing components to the RF processing components, the number of received samples corresponding to a current cyclic prefix length being employed.

14. The modem apparatus according to claim 12, wherein the cyclic prefix processing component is arranged to access the buffer and append samples stored in the buffer to remaining samples of a symbol from which the stored samples originate.

15. The modem apparatus according to claim 5, wherein
the cyclic prefix processing component is arranged to operate in accordance with use of a first cyclic prefix length and a second cyclic prefix length; and
the cyclic prefix processing component is responsive to the control information and arranged to select one of the first cyclic prefix length and the second cyclic prefix length in response to at least part of the control information.

16. The modem apparatus according to claim 15, wherein the control information comprises a cyclic prefix length setting and wherein the cyclic prefix length setting is updated in response to receipt of a timing advance command.

17. A communications apparatus comprising the modem apparatus according to claim 1.

18. A communication system comprising the modem apparatus according to claim 1.

19. An modem apparatus according to claim 1, wherein
the cyclic prefix component is arranged to operate in accordance with use of a first cyclic prefix length and a second cyclic prefix length; and
the cyclic prefix component is responsive to the control information and arranged to select one of the first cyclic prefix length and the second cyclic prefix length in response to at least part of the control information.

20. The modem apparatus according to claim 19, wherein the control information comprises a cyclic prefix length setting.

21. A method of processing a cyclic prefix in a modem apparatus configured to provide wireless network access in accordance with an Orthogonal Frequency Division Multiplexing communications scheme, the method comprising:
baseband processing components converting signals between time and frequency domains in accordance with the Orthogonal Frequency Division Multiplexing communications scheme;
baseband processing components converting data between parallel and serial data formats;
Radio Frequency (RF) processing components processing a cyclic prefix data in response to control information; and
a digital interface interfacing between the baseband processing components and the RF processing components to communicate data between a node associated with the parallel and serial data format conversion and a node associated with the cyclic prefix processing.

* * * * *